United States Patent [19]

Button et al.

[11] Patent Number: 5,524,158
[45] Date of Patent: Jun. 4, 1996

[54] METHOD OF MAKING FIBER OPTIC COUPLERS

[75] Inventors: Leslie J. Button, Big Flats; Michael P. Donovan, Painted Post; Donald R. Young, Jr., Corning, all of N.Y.

[73] Assignee: Corning Incorporated, Corning, N.Y.

[21] Appl. No.: 281,018

[22] Filed: Jul. 27, 1994

[51] Int. Cl.$^6$ .................................................. G02B 6/26
[52] U.S. Cl. .............................. 385/51; 385/96; 385/99; 65/408; 65/409; 65/411
[58] Field of Search ................................ 65/406, 408, 409, 65/411; 385/51, 39, 42, 43, 46, 48, 95, 96, 99

[56] References Cited

U.S. PATENT DOCUMENTS

| 4,902,324 | 2/1990 | Miller et al. | 65/3.11 |
|---|---|---|---|
| 5,015,062 | 5/1991 | Finzel | 385/95 |
| 5,251,276 | 10/1993 | Berkey et al. | 385/43 |
| 5,261,018 | 11/1993 | Suganuma et al. | 385/51 |
| 5,274,724 | 12/1993 | Brehm et al. | 385/93 |
| 5,305,404 | 4/1994 | Robson | 385/43 |

FOREIGN PATENT DOCUMENTS 2-199413  8/1990  Japan ........................................ 385/96

*Primary Examiner*—John Ngo
*Attorney, Agent, or Firm*—W. J. Simmons, Jr.

[57] ABSTRACT

Overclad fiber optic couplers typically include an elongated glass body having a solid midregion through which at least two glass optical fibers extend in optical signal coupling relationship. At each end of the midregion is an end region containing a bore from which optical fiber pigtails extend. In accordance with the invention, each end region includes a first projecting portion, one surface of which forms a ledge. That end of each bore opposite the midregion terminates at a recessed face that intersects the respective ledge. One end of at least the first fiber extends from the first bore. That portion of the first fiber outside the first bore has a coating that extends along the ledge, the coating terminating outside the first bore. A mass of glue extends between the ledge and the recessed face and encompasses the bare portion of the first fiber that extends along the first ledge and at least a portion of the first coating that extends along the first ledge. A method of making the coupler is also disclosed.

15 Claims, 3 Drawing Sheets

METHOD OF MAKING FIBER OPTIC COUPLERS

BACKGROUND OF THE INVENTION

The present invention relates to MxN fiber optic couplers, wherein M is equal to or greater than 1 and N is equal to or greater than 2, and to a method of making such couplers. The method of this invention is especially useful for making 1×2 and 2×2 couplers.

Fiber optic couplers referred to as "fused fiber couplers" have been formed by positioning a plurality of fibers in a side-by-side relationship along a suitable length thereof and fusing and stretching the fibers to reduce the spacings between the cores. Various coupler properties can be improved by encapsulating the coupling region of the fibers in a matrix glass to form an "overclad coupler". Portions of the fibers to be fused are inserted into the longitudinal bore of a glass tube having a refractive index lower than that of the fiber claddings. Each end of the longitudinal bore is typically connected to its respective tube end surface by a funnel. The tube midregion is collapsed onto the fibers; the central portion of the midregion is then drawn down to that diameter and coupling length which is necessary to obtain the desired coupling.

An end region of the resultant coupler is shown in FIG. 6. The midregion of tube 60 is illustrated as being collapsed on fibers 62 and 63. Protective coatings 64 and 65 extend into funnel 66. After the coupler has cooled, a drop of glue is applied to each funnel, and thereafter cured, to increase the pull strength of the fibers. To apply the glue, a hollow filament 68 that is connected to a vacuum source is inserted into funnel 66. The applicator needle of a glue-containing syringe (not shown) applies a drop of glue at the end of funnel 66. A sufficient amount of glue 67 is dispensed to cover the bare regions of the fibers that extend into the funnel. The drop of glue is drawn to the bottom of the funnel by the evacuated filament. A sufficient period of time can be allowed to elapse to permit the glue to "wick" or flow by capillary action between the fibers and the adjacent wall of the bore to form a bead that extends into the bore. The glue is then cured.

Various disadvantages can arise when the above-described method is employed. The glue in the funnel can shrink due to temperature change and become detached from one side of the funnel. This can cause a fiber located in the glue adjacent the point of detachment to bend and thus become stressed and subject to fatigue; such a fiber may also exhibit microbending loss. This finding has been reinforced by computer modeling of overclad fiber optic couplers. Modeling results on coupler designs with funnels have shown that encapsulating the epoxy around the full 360 degrees of the funnel interior tends to lead to significant axial strains (and stresses) of the fibers. Also, models of void areas and delaminations within the bore have shown the existence of large stresses on the fibers.

Elimination of the funnel could lead to a simpler process for making certain kinds of couplers. The glue could be more easily applied since the process would be less dependent upon the flow characteristics of the glue. This would permit the use of different glue application techniques and would allow a greater freedom in the choice of glues, for example, higher viscosity glues might be employed.

SUMMARY OF THE INVENTION

It is an object of the present invention to provide a method and a coupler construction that overcomes the disadvantages of the prior art. Another object of the present invention is to provide a robust overclad fiber optic couplers which can reliably withstand temperature extremes and mechanical influences such as pulling on the fiber pigtails extending therefrom, and to a method of making such a coupler.

Briefly, the overclad fiber optic coupler of the present invention comprises an elongated glass body having a midregion through which at least two glass optical fibers longitudinally extend. The fibers are in signal coupling relationship in the midregion. At least a first of the fibers extends from a first end of the body. The portion of the body between the first end and the midregion constitutes a first end region that contains a longitudinal bore through which at least the first fiber extends. In accordance with the invention, the first end region includes a first projecting portion, one surface of which forms a ledge. The first end region of the body has a recessed face that intersects the ledge. That end of the bore opposite the midregion intersects the face. One end of at least the first fiber extends from the first bore. That portion of the first fiber outside the first bore has a coating that extends along the ledge and terminates outside the first bore so that the portion of the first fiber within the midregion and the bore is bare. A first mass of glue secures to the ledge the bare portion of the first fiber that extends along the ledge and at least a portion of the first coating that extends along the ledge.

The invention also relates to a method of making a fiber optic coupler. The method utilizes a glass tube having first and second opposite end regions, a midregion, and a longitudinal bore extending therethrough. A portion of at least one end of the tube is removed to form a recessed face to which a first end of the bore extends and to form a ledge that intersects the recessed face. At least two glass optical fibers are disposed within the longitudinal bore, those portions of the fibers within the bore being bare. At least one of the fibers extends from the first end of the bore, that portion of the first fiber outside the first bore having a coating that extends along the ledge. The coating terminates outside the first bore. The midregion of the tube is heated to collapse the midregion onto the fibers, and the central portion of the midregion is drawn to reduce the diameter thereof. A first mass of glue is applied to the bare portion of the first fiber that extends along the ledge, and to at least a portion of the first coating that extends along the ledge, to affix the first fiber to the tube.

DESCRIPTION OF THE PREFERRED EMBODIMENTS

The drawings are not intended to indicate scale or relative proportions of the elements shown therein.

Overclad fiber optic couplers can be formed by methods disclosed in U.S. Pat. Nos. 4,902,324, 5,251,276 and 5,305,404 which are incorporated herein by reference. The 1×2 coupler described herein is deemed to be typical of MxN couplers, where $M \geq 1$ and $N \geq 2$.

Figure 1:
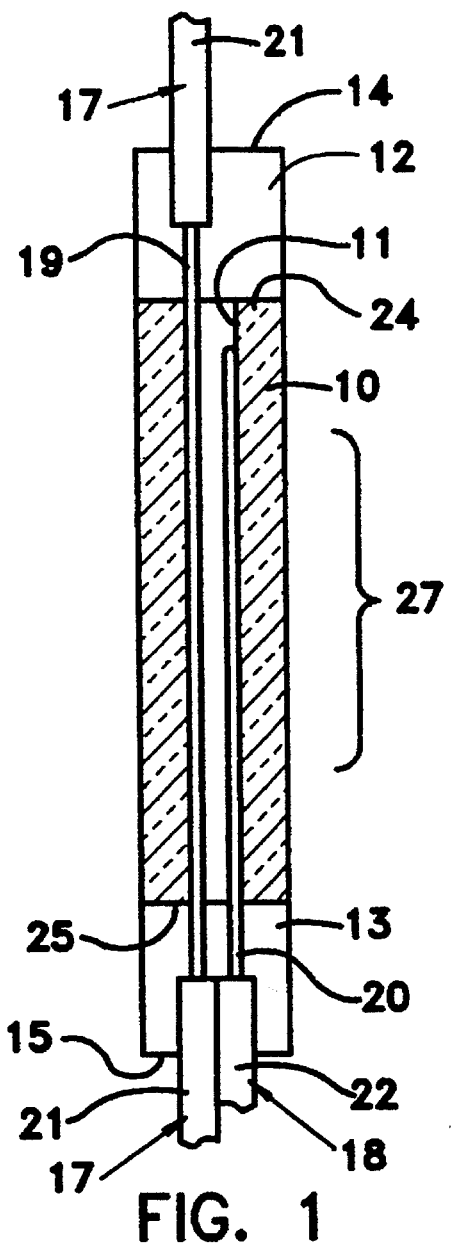
FIG. 1 is a cross-sectional view of a capillary tube after insertion of optical fibers to make a 1×2 coupler preform.
Figure 2:
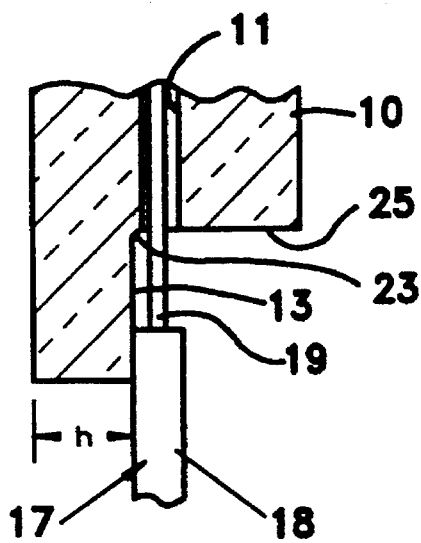
FIG. 2 is a partial cross-sectional view illustrating the ledge at an end of the tube.
Figure 2A:
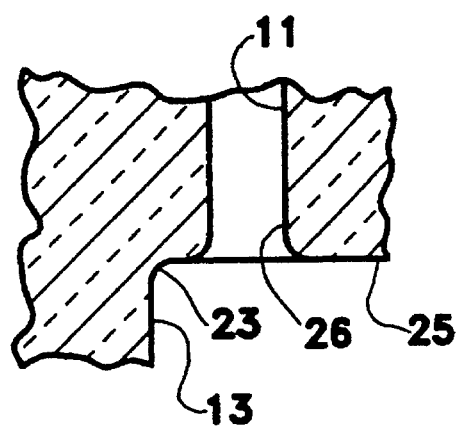
FIG. 2a is a partial cross-sectional view illustrating a flared bore.

Referring to FIGS. 1 and 2, tube 10 has a longitudinal bore 11 and ledges 12 and 13 at opposite ends thereof. Tube 10 is preferably composed of silica doped with $B_2O_3$ and optionally fluorine. However, other glass compositions can be employed, provided that they provide the desired refractive index and mechanical properties. Ledges 12 and 13 can be formed by grinding away a portion of the ends of tube 10 to expose recessed faces 24 and 25 that are intersected by bore 11. The intersection 23 between each ledge and corresponding face is preferably rounded to improve tube strength. This can be formed by employing a grinding wheel having a suitably rounded edge. Since the grinding operation produces sharp edges at the intersection of bore 11 and faces 21 and 22, the ends of the bore are preferably rounded or flared. This can be accomplished by merely directing a pencil flame toward each end of the bore. As shown in FIG. 2a, bore 11 can be provided with a flared end region 26 by flowing an etchant gas such as $NF_3$ from that end of the bore at which the heat source is being directed. Care must be taken to ensure that the ledge is not unduly etched by this process.

Protective coating material 21, 22 is stripped from the appropriate portions of coated optical fibers 17 and 18 (FIG. 1). A sufficient length of coating is removed from fiber 17 so that coatings 21 lie on ledges 12 and 13, the ends of the coatings preferably terminating at approximately the longitudinal middle of the ledges. A sufficient length of coating is removed from fiber 18 so that when coating 22 terminates at about the middle of ledge 13, the end of bare fiber 20 extends beyond tube midregion 27. An antireflection termination can be formed on the end of fiber 20 as disclosed in U.S. Pat. No. 5,251,276.

Figure 4:
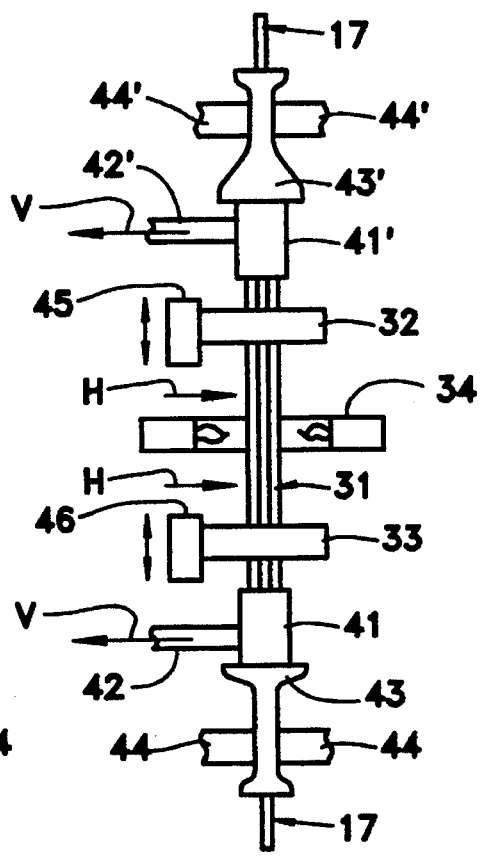
FIG. 4 is a schematic illustration of an apparatus for collapsing a capillary tube, stretching the midregion thereof, and optionally supporting it during the glue application process.

The fibers can be threaded into or through the tube off-line as described in U.S. Pat. No. 4,902,324. That is, fiber 17 can be threaded through tube bore 11 until the uncoated portion thereof is located in the tube midregion, and its coatings lie adjacent ledges 12 and 13 as shown in FIG. 1. Fiber 20 can inserted into bore 11 until it extends through midregion 27 and coating 22 lies adjacent coating 21 on ledge 13. Alternatively, the uncoated portion of coated fiber 18 can be held adjacent the uncoated portion of coated fiber 17, and both can be moved together toward tube end 14 until the coating end regions are located on ledge 13, the uncoated fiber portions then extending through midregion 27. The end of bared fiber 20 is preferably located between midregion 27 and face 24 of tube 10. The fibers are "tacked" to the tube to maintain the uncoated portions of the fibers in proper position while the tube is inserted into the draw apparatus of FIG. 4. A drop of glue may be applied to either the coated region or to both the coating and the fiber.

Figure 3:
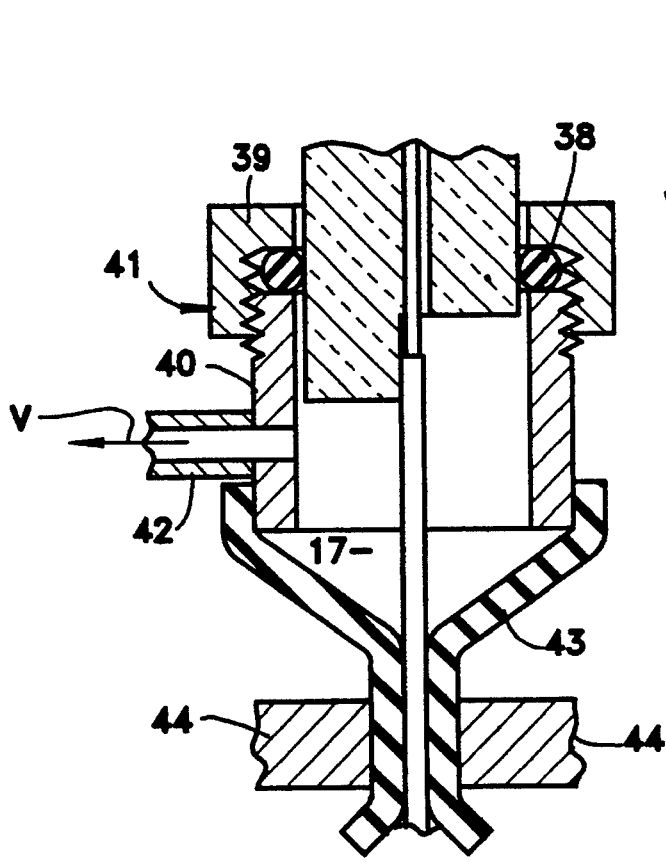
FIG. 3 is a cross-sectional view of an end of a coupler preform showing a vacuum attachment affixed thereto.

Tube 10 is inserted through ring burner 34 (FIG. 4) and is clamped to draw chucks 32 and 33 having motor controlled stages 45 and 46. The fibers are threaded through the vacuum attachments 41 and 41', and the vacuum attachments are then attached to the ends of tube 10. Referring to FIG. 3, vacuum attachment 41 is placed over the end of tube 10, and collar 39 is tightened to compress O-ring 38 against the tube. Vacuum line 42 is connected to tube 40. One end of a length of thin rubber tubing 43 is attached to that end of vacuum attachment 41 opposite preform 31; the remaining end of the tubing extending between clamp jaws 44. Upper vacuum attachment 41' is similarly associated with line 42', tubing 43' and clamp jaws 44'. The coated portions of the fibers extend from tubing 43 and 43'. Vacuum is applied to coupler preform 31 by clamping jaws 44 and 44' on tubing 43 and 43'.

Figure 5:
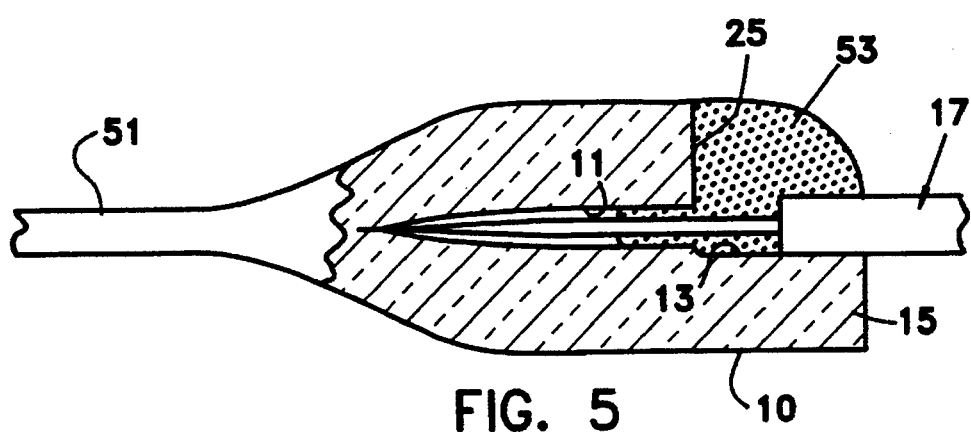
FIG. 5 is a partial cross-sectional illustration of a fiber optic coupler after it has been drawn down and glue has been added.

With a vacuum source connected to the tube bore, ring burner 34 is ignited, and its flames heat tube 10, causing tube midregion 27 to collapse onto fibers 19 and 20. After the tube cools, the burner is reignited to heat the center of the collapsed region, and stages 45 and 46 are pulled in opposite directions to elongate tube 10 and form neckdown region 51 (FIG. 5). After the coupler cools, the vacuum lines are removed.

Clamps 44 and 44' are released from the flexible vacuum hoses 43 and 43'. Vacuum attachments 41 and 41' can then be removed.

The coupler can remain in the chucks during the application of glue 53 to ledges 12 and 13. A small amount of the glue can wick down into the end of bore 11. The glue can extend a small distance into bore 11, if it is desirable to seal the bore with the glue. The glue is then cured.

Figure 6:
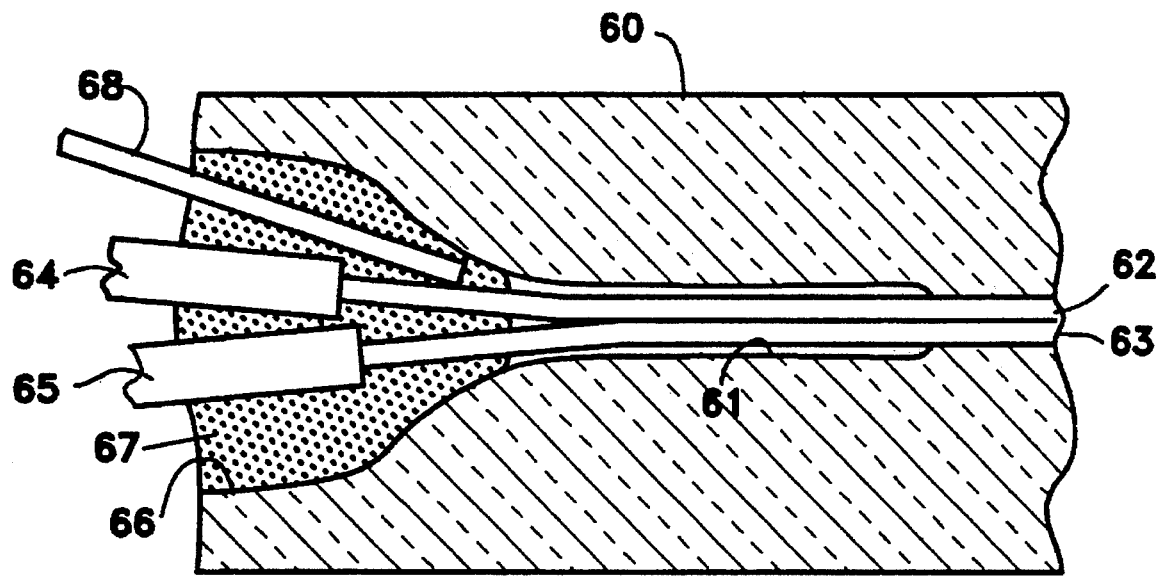
FIG. 6 is a cross-sectional view of an end region of a prior art coupler.

Simplified mathematical models indicate that a millimeter or two of epoxy with sufficiently high elastic modulus on the tube ledge should be sufficient to attenuate any reasonable tensile load on the fiber pigtail extending from the coupler. With the above-described design, the thermal stresses applied to the epoxy/glass interface, especially tensile stress, will be less than in designs in which the epoxy is totally encapsulated by the tube, as in FIG. 6.

Couplers of the 1×2 type were made from glass tubes having a length of 32 mm and an outside diameter of 2.6 mm. The bore diameter was 0.265 mm. A grinding wheel having a 0.8 mm radius on one edge was traversed across each end of the tube to form 2.5 mm long ledges. Thus, the intersection between the face 25 and ledge 13 was rounded. The tubes were then ultrasonically cleaned, rinsed and blown dry and then heated to 85° C. for 10 minutes. $NF_3$ was flowed through the tube bore while the end of the bore was heated by a flame to form a flared region 26.

The height h of the ledge was about 1.104 mm. The optical fiber diameter was 125 μm and the coating diameter was 250 μm. The ledge was therefore located a sufficient distance below the tube bore so that the fiber coating could rest on the ledge when the bare fiber was in the bore. After the coupler was formed by collapsing the tube midregion onto the fibers and stretching the central portion of the collapsed midregion, a UV curable epoxy was applied to the ledge and adjacent fiber region as shown in FIG. 5. The low expansion epoxy which was employed is Formulation B of Table 4 of U.S. patent application Ser. No. 08/251,326 entitled "Low Expansion Polymeric Compositions" (Francis et al.) filed May 31, 1994, which is incorporated herein by reference. The ingredient amounts, in pbw (parts by weight), are:

(a) 31.36 pbw ELC2500, an epoxy resin/photoinitiater blend available from Electrolite Corp., Danbury, Conn., (b) 0.32 pbw Cyracure UVI-6974 a photoinitiater available from Eastern Chemical, Philadelphia, Pa., (c) 8.42 pbw Geltech 2.2 Microspheres-1.5 microns, a silica filler silanized with 0.5 wt.% A-187 silanizing compound, available from Geltech Corp., Alachus, Fla., and (d) 58.91 pbw magnesium pyrophosphate particles, a temperature inversion filler comprising particles of one or more crystallized phosphate glasses, each of the glasses being composed essentially of $P_2O_5$ and one or more cations selected from the group consisting of magnesium, cobalt, arsenic, zinc, iron, aluminum, and zirconium.

The temperature inversion fillers of choice can be described by the formula $Mg_{2-x}A_xP_2O_7$, where x is between 0 and 2, and A can be Co to raise the inversion temperature or As, Zn, Fe, Al, or Zr to lower the inversion temperature. The temperature inversion particles should be at least about 5 microns in size (major dimension), and they should be smaller than about 100 microns.

The pigtails extending from the resultant couplers exhibited very good tensile strength.

Figure 7:
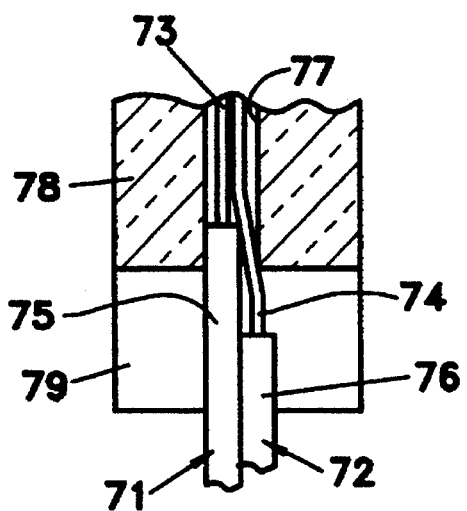
FIG. 7 is a partial cross-sectional view of a tube illustrating a modified fiber insertion technique.

Overclad 2×2 fiber optic couplers can be made by a process similar to that described above in connection with 1×2 couplers. However, as shown in FIG. 7 the following changes can be made to the fiber threading procedure to secure the fibers in their proper position. The bore diameter is larger than that of a 1×2 coupler, namely 0.390 mm for 125 μm diameter fibers having a 250 μm diameter coating. The coating 75, 76 is stripped from the central region of two coated optical fibers 71, 72, respectively, and the fibers are threaded into a glass tube 78, the uncoated portions 73, 74 of the fibers being in the tube midregion.

The fiber positioning technique disclosed in U.S. Pat. No. 5,305,404 is optionally employed. In accordance with that technique, the coating 75 of one of the fibers is inserted a short distance into the tube bore 77 at one end of the tube, the coating 76 of the other fiber ending near the longitudinal midregion of ledge 79. The coating of one of the fibers is inserted a short distance into the tube bore 77 at the other end of the tube. If this optional technique is not employed, the coatings of both fibers are positioned on the ledge as shown in FIG. 1. The fibers are then "tacked" to the tube, and the resultant preform is inserted into the apparatus of FIG. 4 where it is drawn into a coupler as described above.

Figure 8:
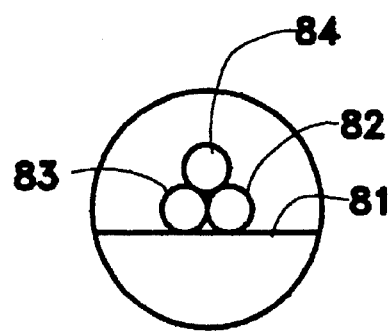
FIG. 8 is an end view of a coupler having three fibers extending therefrom.

As the number of fibers extending from an end of the tube increases, it becomes more difficult to affix them to a ledge. Three fibers could be arranged as shown in FIG. 8, wherein coated fibers 82 and 83 are in contact with ledge 81 and coated fiber 84 is located on fibers 82 and 83. If more than three fiber pigtails were to extend from one end of the tube, the ledge would have to be long enough to permit the fibers to extend from their coated portions and into the tube bore without unduly subjecting the fibers to loss-inducing bends.

A 1×2 or 2×2, for example, could be made from a tube having a ledge at both ends. A coupler such as a 1×8 might have a ledge at the end from which the single fiber extends and a funnel at the end from which the eight fibers extend.

We claim:

1. In an overclad fiber optic coupler comprising an elongated glass body having a midregion through which at least two glass optical fibers longitudinally extend, said fibers being in signal coupling relationship in said midregion, at least a first of said fibers extending from a first end of said body, the portion of said body between said first end and said midregion constituting a first end region that contains a first longitudinal bore through which at least said first fiber extends, said first longitudinal bore having a longitudinal axis, the improvement wherein said first end region includes a first projecting portion, one surface of which forms a ledge, the first end region of said body having a recessed face that intersects said ledge, that end of said bore opposite said midregion intersecting said face, there being at least one plane that passes through said longitudinal axis but does not intersect said ledge, one end of at least said first fiber extends from said first longitudinal bore, that portion of said first fiber outside said first bore having a coating that extends along said ledge, said coating terminating outside said first bore so that the portion of said first fiber within said midregion and said bore is bare, and a first mass of glue securing to said ledge the bare portion of said first fiber that extends along said ledge and at least a portion of said first coating that extends along said ledge.

2. A coupler in accordance with claim 1 wherein said glue also seals the open end of said bore.

3. A coupler in accordance with claim 1 wherein that end of said first bore from which said first fiber extends has a rounded edge.

4. A coupler in accordance with claim 1 wherein that end of said first bore from which said first fiber extends has a flared end.

5. A coupler in accordance with claim 1 wherein at least a second of said fibers extends from a second end of said body, the portion of said body between said second end and said midregion constituting a second end region that contains a second longitudinal bore through which at least said second fiber extends, said second end region includes a second projecting portion, one surface of which forms a second ledge, one end of at least said second fiber extends from said second longitudinal bore, that portion of said second fiber outside said first bore having a coating that extends along said second ledge, said coating terminating outside said second bore so that the portion of said second fiber within said midregion and said second bore is bare, and a second mass of glue securing to said second ledge the bare portion of said second fiber that extends along said second ledge and at least a portion of said second coating that extends along said second ledge.

6. A coupler in accordance with claim 5 wherein said glue also seals the open end of said bore.

7. A coupler in accordance with claim 1 wherein one end of a second fiber extends from said first bore, that portion of said second fiber outside said first bore having a coating that terminates inside said first bore so that a portion of said second fiber within said first bore is bare and the entire portion of said first fiber within said midregion is bare.

8. A coupler in accordance with claim 1 wherein said face is substantially parallel to said ledge.

9. A coupler in accordance with claim 1 wherein said ledge is substantially flat.

10. A coupler in accordance with claim 1 wherein said first coating lies on said ledge.

11. A coupler in accordance with claim 1 wherein the end of said coating terminates along said ledge.

12. An optical fiber coupler comprising an elongated glass body having a solid midregion and first and second end regions respectively extending from opposite ends of said midregion, first and second longitudinal bores respectively extending through said first and second end regions to said midregion, each of said first and second longitudinal bores having a cylindrical portion and tapered portion between the cylindrical portion and said midregion, said first end region including a first projecting portion, one surface of which forms a ledge, the first end region of said body having a recessed face that intersects said ledge, that end of said first bore opposite said midregion intersecting said face, at least two glass optical fibers extending through said midregion and being in optical signal coupling relationship within said midregion, one end of at least said first fiber extending from said first bore, that portion of said first fiber outside said first bore having a coating that extends along said ledge and terminates outside said first bore so that the portion of said first fiber within said midregion and said first bore is bare, and a mass of glue extending between said ledge and said face and encompassing the bare portion of said first fiber that extends along said first ledge and at least a portion of said first coating that extends along said first ledge.

13. A coupler in accordance with claim 12 wherein that end of said tube opposite said first end has a second projecting portion, one surface of which forms a second ledge, one end of at least a second of said fibers extending from said second bore, that portion of said second fiber outside said second bore having a coating that extends along said ledge and terminates outside said first bore so that the portion of said first fiber within said midregion and said second bore is bare, and a mass of glue securing to said second ledge the bare portion of said first fiber that extends along said second ledge and at least a portion of said second coating that extends along said second ledge, said glue also sealing the open end of said second bore.

14. A method of making a fiber optic coupler comprising the steps of providing a glass tube having first and second opposite end regions, a midregion, and a longitudinal bore extending therethrough, removing a portion of at least one end of said tube to form a recessed face to which a first end of said bore extends and to form a ledge that intersects said recessed face, disposing within said longitudinal bore at least two glass optical fibers, those portions of said fibers within said midregion being bare, at least one of said fibers extending from the first end of said bore, that portion of said first fiber outside said first bore having a coating that extends along said ledge, said coating terminating outside said first bore, heating the midregion of said tube to collapse said midregion onto said fibers, drawing the central portion of said midregion to reduce the diameter thereof, and applying a first mass of glue to the bare portion of said first fiber that extends along said ledge and to at least a portion of said first coating that extends along said ledge, to affix said first fiber to said tube.

15. A method in accordance with claim 14 wherein the step of applying said glue further comprises flowing said glue into the open end of said bore to seal said bore.

* * * * *